(12) United States Patent
Ebrahimbabaie Varnosfaderani et al.

(10) Patent No.: US 12,387,063 B2
(45) Date of Patent: Aug. 12, 2025

(54) METHOD AND DETECTOR FOR DETECTING A PRESENCE OF A WIRELESS DEVICE

(71) Applicant: NXP B.V., Eindhoven (NL)

(72) Inventors: Pouyan Ebrahimbabaie Varnosfaderani, Graz (AT); Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 351 days.

(21) Appl. No.: 18/301,315

(22) Filed: Apr. 17, 2023

(65) Prior Publication Data

US 2024/0346262 A1 Oct. 17, 2024

(51) Int. Cl.
*G06K 7/00* (2006.01)
*G06K 7/10* (2006.01)

(52) U.S. Cl.
CPC ....... *G06K 7/10237* (2013.01); *G06K 7/0008* (2013.01)

(58) Field of Classification Search
CPC .......... G06K 7/10237; G06K 7/0008
See application file for complete search history.

(56) References Cited

U.S. PATENT DOCUMENTS

| | | | |
|---|---|---|---|
| 9,124,302 B2 | 9/2015 | Krishnan et al. | |
| 9,171,440 B2 | 10/2015 | Frederick | |
| 11,037,435 B2 * | 6/2021 | Wobak | G08B 21/182 |
| 2013/0258312 A1 * | 10/2013 | Lewis | G01S 7/4865 |
| | | | 356/4.01 |
| 2021/0150882 A1 * | 5/2021 | Wobak | G08B 21/182 |
| 2022/0231728 A1 * | 7/2022 | Wobak | H04B 5/72 |

\* cited by examiner

*Primary Examiner* — Ping Y Hsieh (57) ABSTRACT

A method and wireless device with a counterpart presence detector is provided. The detector includes only memory and logic circuits to detect a change in a ringing artifact from the presence of a RF device. The memory stores template signals and threshold values. The template signals may be generated using a metal object positioned various distances from the RF device. The ringing artifact, also called an RF-off signal, is sampled. A difference between subsequent ringing artifact samples is taken to produce a ringing artifact difference. Also, a difference between subsequent samples of a template signal is taken to produce a template difference. A Euclidean distance between the ringing artifact difference and the template difference is determined. The distance is compared to a threshold value. A presence of another RF device within the RF field of the RF device is detected if the distance compares favorably to the threshold value.

20 Claims, 8 Drawing Sheets

METHOD AND DETECTOR FOR DETECTING A PRESENCE OF A WIRELESS DEVICE

FIELD

This disclosure relates generally to electronic circuits, and more particularly, to a method and detector for detecting a presence of a wireless device.

RELATED ART

The popularity of near field communication (NFC) applications in smart battery-enabled devices such as smartwatches and smartphones has increased over the years. The performance and functionalities of smart battery-enabled devices are improving with respect to both the hardware and software. However, improving power consumption is still an important goal. Hence, the demand for minimizing the power consumption of NFC applications, and ultimately increasing the battery life, is gradually increasing.

To minimize power consumption and consequently increase battery life, an NFC-enabled device should remain in standby, or asleep, except when a counterpart NFC counterpart device such as an NFC tag or an NFC reader is present in its RF field. The NFC device should wake up and initiate a communication only when a valid NFC counterpart is in its vicinity. To further improve battery life, the NFC device should avoid false wakeups as much as possible.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method and detector for detecting a counterpart wireless device within a radio frequency (RF) field transmitted by an RF device. The detector does not require a processor and includes only memory and logic circuits to detect a change in a ringing artifact of a presence check "ping" transmitted by the RF device. The ringing artifact is also called an "RF-off" signal. The memory of the detector stores pre-recorded template signals and threshold values. The template signals may be generated using a metal object positioned various distances from the RF device. The logic circuit includes digital logic circuits. The detector detects a counterpart wireless device with a low false detection rate for metal objects that come within the RF field. In the method, a plurality of ringing templates is stored in the memory. An RF ping signal is transmitted by the RF device having the detector. A receiver of the RF device receives a ringing artifact of the RF ping signal after the end of transmission of the RF ping signal. The ringing artifact of the RF ping signal is sampled a predetermined number of samples. A difference between a first sample and a second sample of the predetermined number of samples is computed to produce a ringing artifact difference. Also, a difference between a first ringing template and a second ringing template of the plurality of ringing templates is computed to produce a template difference. A Euclidean distance between the ringing artifact difference and the template difference is computed. The distance is compared to a threshold value stored in the memory. A presence of another RF device within the RF field of the RF device is detected if the distance compares favorably to the threshold value.

A RF device with the detector is able to detect the presence of another counterpart RF device within its RF field with a low false detection rate using only memory for storing the templates and thresholds, and a logic circuit to compute the Euclidean distance. The resources of a processor are not required.

In accordance with an embodiment, there is provided, a method for detecting a presence of a second radio frequency (RF) device by a first RF device, the method including: storing a plurality of templates in the first RF device; transmitting an RF ping signal by a transmitter at an antenna of the first RF device; receiving a ringing artifact of the RF ping signal by a receiver of the first RF device after the RF ping signal ends; sampling the ringing artifact of the RF ping signal for a predetermined number of samples; subtracting a first sample of the predetermined number of samples of the ringing artifact from a second sample of the predetermined number of samples of the ringing artifact to produce a ringing artifact difference; subtracting a first template of the plurality of ringing templates from a second template in the plurality of templates to produce a template difference; computing a distance between the ringing artifact difference and the template difference; comparing the distance to a threshold value; and detecting a presence of the second RF device to the first RF device if the distance compares favorably to the threshold value. Determining the distance between the ringing artifact difference and the template difference may further include computing a Euclidean norm of the RF ringing artifact. The threshold value may be one of a plurality of threshold values, the method may further include: performing the method for all of the predetermined number of samples and the plurality of ringing templates; and comparing a distance for each of the samples to a corresponding threshold value of the plurality of threshold values to determine a plurality of comparison results; and a logic gate having inputs for receiving the plurality of comparison results and an output for providing a wakeup signal to the first RF device in response to detecting the presence of the second RF device. The method may further include using a counter to select each of the samples and corresponding ringing templates. Computing the distance may further include computing the distance using one of either Euclidean distance, Manhattan distance, Minkowski distance, Levenshtein distance, dynamic time warping, or Kullback-Leibler divergence. The stored ringing templates may be ordered according to a distance from the RF device. The method may further include determining the plurality of threshold values by moving a metal object toward the first RF device while recording resulting RF ringing artifacts at specific distances from the first RF device. The first RF device and the second RF device may communicate using a near field communication (NFC) protocol. The first RF device may be a smartphone.

In another embodiment, there is provided, a method for detecting a presence of a second radio frequency (RF) device by a first RF device, the method including: storing a plurality of template signals in the first RF device; storing a plurality of corresponding threshold values; sampling, by a logic circuit of the first RF device, a ringing artifact of a RF ping signal for a predetermined number of samples, wherein the ringing artifact is generated at an end of the RF ping signal transmitted by the first RF device; subtracting a first sample of the predetermined number of samples of the ringing artifact from a second sample of the predetermined number of samples of the ringing artifact to produce a ringing artifact difference; subtracting a first sample of a predetermined number of samples of a template signal of the plurality of template signals from a second sample of the predetermined number of samples of the plurality of templates signals to produce a template difference; computing a distance between the ringing artifact difference and the template difference; comparing the distance to a threshold value to produce a comparison result; performing the steps of subtracting, computing, and comparing for each sample of the plurality of samples to produce a plurality of comparison results; providing the plurality of comparison results to a results buffer; and detecting, using a logic gate coupled to the results buffer, a presence of the second RF device by the first RF device in response to at least one of the plurality of comparison results comparing favorably to a corresponding threshold value of the plurality of corresponding threshold values. Computing the distance may further include computing the distance using one of either Euclidean distance, Manhattan distance, Minkowski distance, Levenshtein distance, dynamic time warping, or Kullback-Leibler divergence. The RF device may communicate with the counterpart device using a near field communication (NFC) protocol. The plurality of template signals may be recorded by moving a metal object toward the first RF device while recording resulting RF ringing artifacts at specific distances from the first RF device. The logic gate may be a NOR logic gate.

In yet another embodiment, there is provided, a radio frequency (RF) device including: a memory configured to store a plurality of template signals; a transmitter configured to transmit an RF ping signal at an antenna of the RF device; a receiver configured to receive a ringing artifact of the RF ping signal after the RF ping signal ends; and a logic circuit configured to sample the ringing artifact of the RF ping signal for a predetermined number of samples, and for each sample: subtract a first sample of the predetermined number of samples of the ringing artifact from a second sample of the predetermined number of samples of the ringing artifact to produce a ringing artifact difference; subtract a first sample of a predetermined number of samples of a template signal of the plurality of template signals from a second sample of the predetermined number of samples of the plurality of templates signals to produce a template difference; compute a distance between the ringing artifact difference and the template difference; compare the distance to a threshold value; and detect a presence of another RF device if the distance is greater than the threshold value. The logic circuit may further include a logic gate to detect the presence of the another RF device if the distance is greater than the threshold value. The logic gate may provide a wakeup signal to the RF device in response to detecting the presence of the another RF device. The RF device may further include using a counter to select each of the samples and corresponding ringing templates. The distance may be computed using one of either Euclidean distance, Manhattan distance, Minkowski distance, Levenshtein distance, dynamic time warping, or Kullback-Leibler divergence. The RF device and the another RF device may communicate via a near field communication (NFC) protocol.

Figure 1:
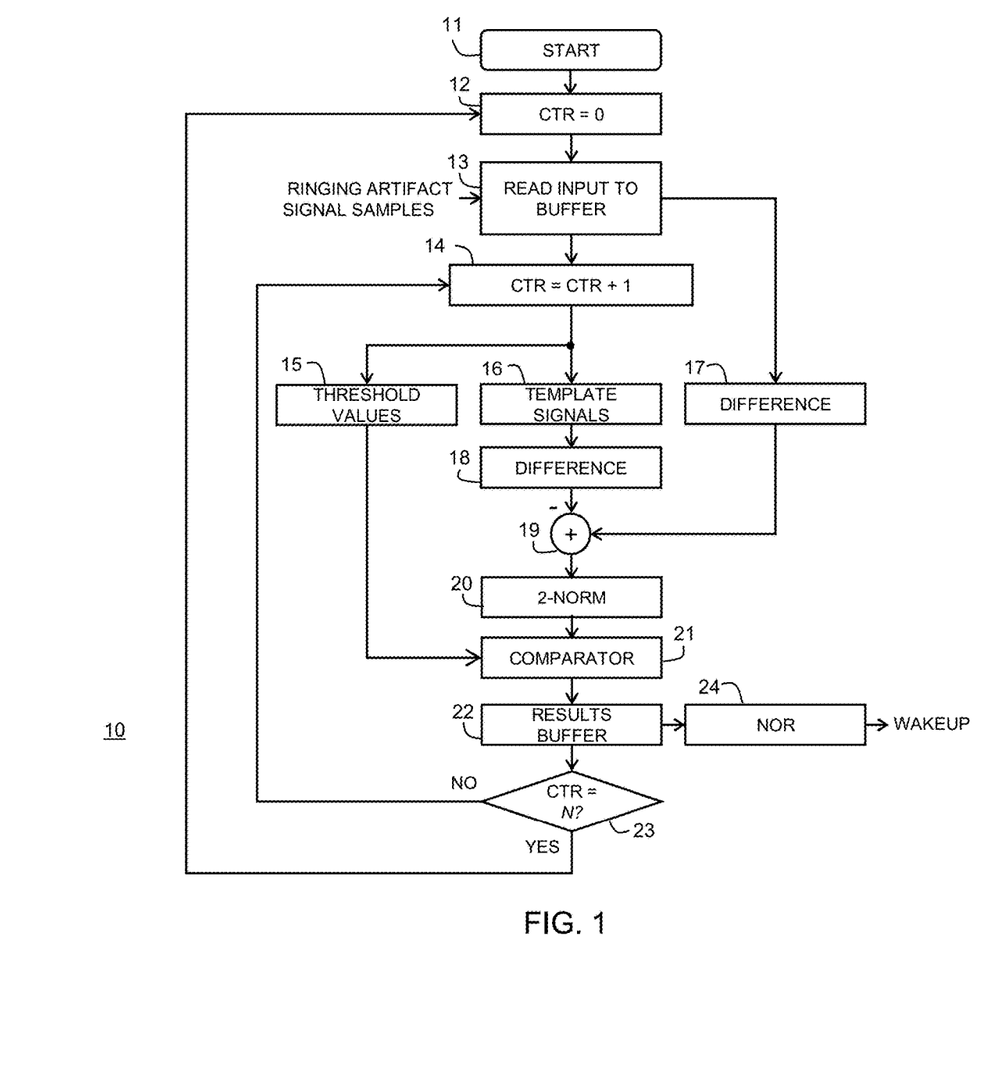
FIG. 1 illustrates a method for a wireless device to detect a presence of a counterpart device in accordance with an embodiment.

FIG. 1 illustrates a flowchart of method 10 to detect a presence of a counterpart RF device in accordance with an embodiment. In one embodiment, an RF device detects the NFC counterpart within the proximity of its RF field by continuously computing Euclidean distances between the difference of the input ringing artifact signal received by a receiver (RX) on the RF device and the difference of pre-recorded template signals, and comparing the Euclidean distances with given threshold values.

Method 10 starts at block 11. The method may be implemented in an integrated circuit for an RF device as hardware, software, or a combination of hardware and software. In one embodiment, the RF device may be an NFC device communicating using an NFC communication protocol. At step 12, a counter provides a count value labeled "CTR" and is initially set to an initial value such as "zero". At step 13, a complex ringing artifact of a ping signal sample is read into a buffer. There are N template signals, and the counter counts from 1 to N to select each signal. At step 14, counter value CTR is incremented by +1. In another embodiment, a counter may be decremented instead of incremented. Also, the counter may be implemented to count from N to 0. At step 15, a threshold value is provided as an input to comparator step 21. At step 16, a template signal of N template signals is provided to step 18, where a difference between two successive samples of a template signal is computed to provide a template signal difference. For example, the template signal difference may be expressed as $y[n]=x[n+1]-x[n]$, where n is the sample number and x represents an input signal. There are N threshold values corresponding to the N template signals. At step 17, a difference between two successive ringing artifact samples from step 13 is computed to provide a ringing artifact difference. At step 19, a difference is computed of the template difference of step 18 and the ringing artifact difference of step 17. At step 20, a 2-norm computation is performed on the result of the difference computed at step 19. The 2-norm is also referred to as a Euclidean norm. At step 21, a comparator compares the threshold values retrieved from memory at step 15 with the output of the 2-norm of step 20. At step 22, a result of the comparison is provided to a results buffer at step 22. At decision step 23, it is determined if counter value CTR is equal to N. If the CTR value is not equal to N, method 10 returns to step 14, and steps 14 through 22 are repeated for another one of the N template signals. If, on the other hand, the CTR value is equal to N, all of the template signals have been input and the method returns to step 12 where the CTR value is again initialized for another complex ringing artifact. Method 10 runs continuously. At step 24, a NOR logic operation is performed on all the comparison results in the results buffer. The output of the NOR logic operation is the binary wakeup signal "WAKEUP". In one embodiment, a logic "0" output corresponds to no valid RF device in the RF field, and a logic "1" output indicates detection of a counterpart RF device within the device's RF field. In another embodiment, a different logic operation may be performed to generate the wakeup signal.

In one embodiment, method 10 relies on a Euclidean distance as the distance metric to assess the distance between the ringing artifact signals and the template signals. However, in other embodiments the method may use either one or a combination of the following distance metrics: (1) Manhattan distance, (2) Minkowski distance, (3) Levenshtein distance, (4) Dynamic time warping (DTW), (5) Kullback-Leibler divergence, or any other distance metric.

Examples of the Manhattan and Minkowski distances, for given complex signals $x_1[n]=x_{I,1}[n]+jx_{Q,1}[n]$ and $x_2[n]=X_{I,2}[n]+jx_{Q,2}[n]$, $n \in [1, L]$ is:

$$d_{Manhattan}(x_1[n], x_2[n]) = \sum_{n=1}^{L} |x_2[n] - x_1[n]|$$

$$d_{Minkowski}(x_1[n], x_2[n]) = \left(\sum_{n=1}^{L} |x_2[n] - x_1[n]|^p\right)^{1/p}$$

where |•| is the complex absolute, $p \geq 1$ is an integer, and n a the ringing artifact sample. The Manhattan and Euclidean distances are particular cases of the Minkowski distance.

Figure 2:
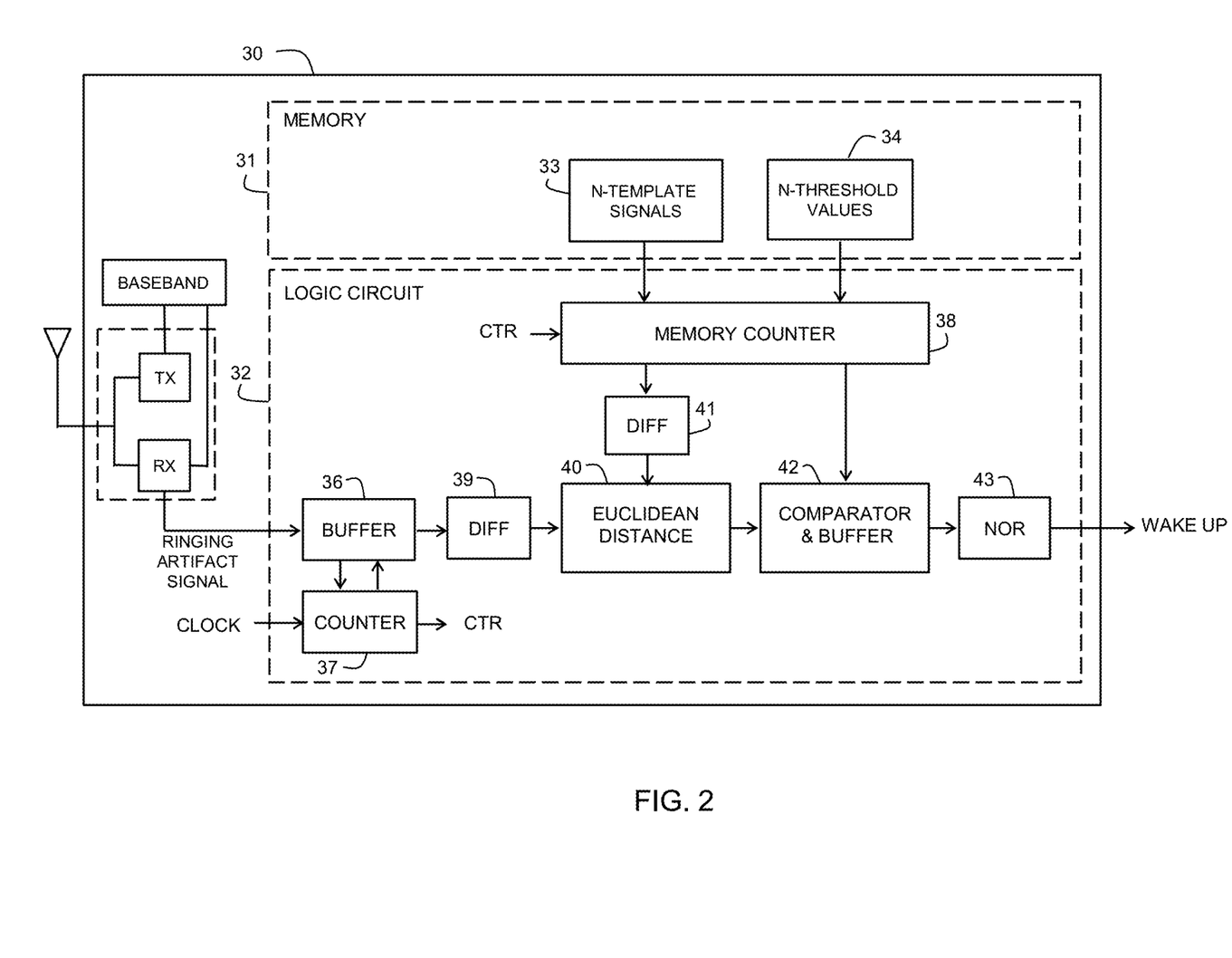
FIG. 2 illustrates an RF device for performing the method of FIG. 1 in accordance with an embodiment.
Figure 4:
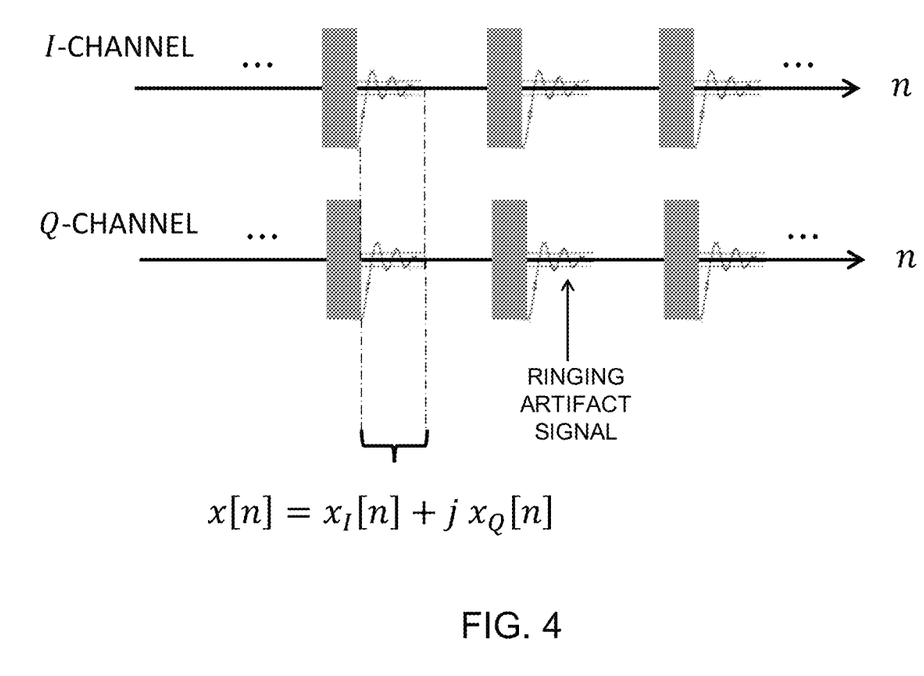
FIG. 4 illustrates a complex valued equivalent baseband RF ringing artifact signal from both I and Q channels.

FIG. 2 illustrates an example RF device 30 for performing the method of FIG. 1 in accordance with an embodiment. RF device 30 includes a memory 31 and a logic circuit 32 that functions together as a detector for detecting a presence of another RF device. RF device 30 may be an NFC device, and includes a transmitter (TX) and a receiver (RX), both coupled to an antenna and to a baseband circuit. The antenna may be a loop antenna for electromagnetically coupling with an antenna of a counterpart RF device for communication and for power transfer. RF device 30 periodically transmits a "ping" or polling message to detect the presence of other devices. A ringing artifact, also called an "RF-off" ringing signal, is produced by the "ping", and is detected by receiver RX. When the antenna is near another device, the RF field of the antenna of RF device 30 is influenced and this influence can be detected in the ringing artifact signal and used to provide a wakeup signal to RF device 30. An example of a ringing artifact signal is illustrated in FIG. 4.

In RF device 30, memory 31 may be any type of memory. For example a volatile memory such as static random-access memory (SRAM) or dynamic RAM (DRAM), or may include non-volatile memory such as flash memory, or other volatile or non-volatile memory may be used. Memory 31 stores N pre-recorded template signals 33 and N threshold values 34. Memory 31 is connected to memory counter 38 in logic circuit 32 that is controlled by counter value CTR produced by counter 37. Counter 37 derives count value CTR using a clock signal CLOCK, which may be a system clock of RF device 30. Memory counter 38 selects the specific template signal and threshold value pointed to by the CTR value. For example, for CTR=n∈[1 N], the threshold values and template signals outputs are the nth threshold value and the nth template signals. Also, buffer 36 provides a sample of the ringing artifact signal in response to the CTR value. Difference block 39 takes a difference y of subsequent input signals, e.g., y[n]=x[n+1]−x[n] received from buffer 36, where n is the sample number. Difference block 41 takes a difference of subsequent samples of template signals 33. Euclidean distance block 40 takes the difference signal results from difference blocks 39 and 41 and produces a Euclidean distance. Comparator and buffer block 42 compares the computed Euclidean distance to a selected threshold value from threshold values 34. If the computed Euclidean distance is below the threshold value, a logic "1" is stored in the result buffer. N comparisons are performed for the N-template signals and N-threshold values and the resulting bit from each result is stored in a location of comparator and buffer 42. Each of the N comparison results is stored as a separate bit. NOR logic block 43 performs a NOR logic operation on all stored comparison results in comparator and buffer 42 and if all of the inputs are equal to a logic "0", a counterpart RF device is detected and a logic "1" is output as a wakeup signal.

Figure 3:
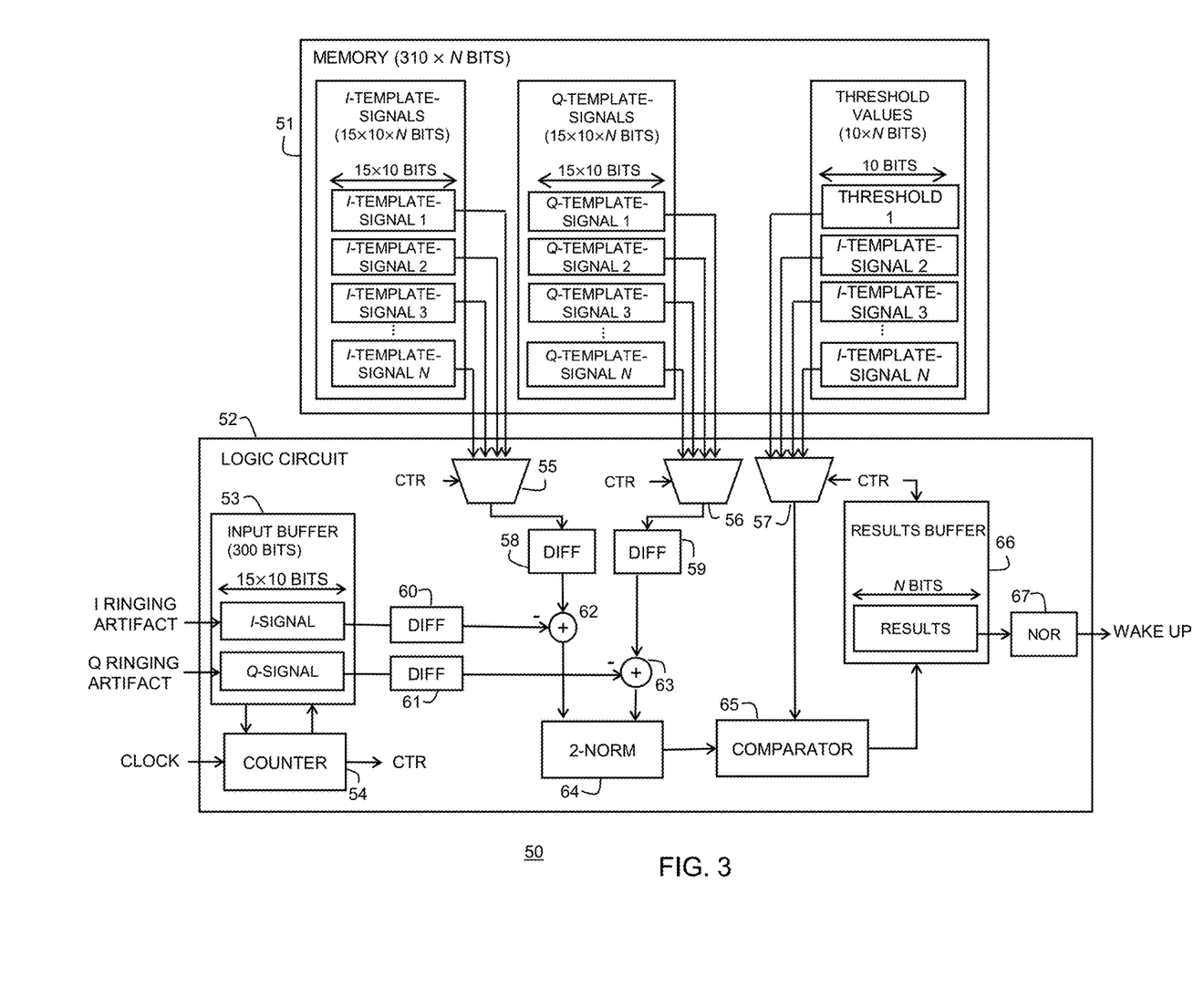
FIG. 3 illustrates a presence detector for performing the method of FIG. 1 in accordance with another embodiment.

FIG. 3 illustrates presence detector 50 for detecting the presence of an RF device according to the method of FIG. 1. Detector 50 includes memory 51 and logic circuit 52. Detector 50 may be implemented as part of an integrated circuit for use in, e.g., an NFC device. Memory 51 stores I-template-signals (150×N bits), Q-template-signals (150×N bits), and threshold values (10×N bits). Note that the size of memory 51 and number of bits used for the N template signals and N threshold values is provided for illustration purposes only and may be different in other embodiments. The I-template signals are provided as input to multiplexer 55 in logic circuit 52. The Q-template signals are provided as input to multiplexer 56, and the threshold values are provided as input to multiplexer 57.

Logic circuit 52, includes digital electronic circuits to perform logic and basic math operations. In another embodiment, logic circuit 52 may be implemented in software or a combination of hardware and software. Difference blocks 60 and 61 take the difference of subsequent I and Q ringing artifact samples from input buffer 53 to produce a ringing artifact difference result. Difference blocks 58 and 59 take the difference of subsequent samples of I and Q template signals to produce a template difference result. That is, for a given complex input signal x[n], the outputs y of difference blocks 60 and 61 is y[n]=x[n+1]−x[n], where n is the sample number and x is an input sample.

Summation block 62 is used to take a difference of the I ringing artifact difference results and I template difference results, and summation block 63 is used to take a difference of the Q ringing artifact difference results and the Q-template difference results. Difference blocks 58-61 and summation blocks 62 and 63 may be implemented as adders for performing complex arithmetic in logic circuit 52. Outputs of summations blocks 62 and 63 are provided to 2-norm block 64. The 2-Norm block 64 computes the Euclidean norm of the input signal, i.e., for a given complex-valued input signal $x[n]=x_I[n]+jx_Q[n], n \in [1,L]$, where L is the length of the signal, and the output of the 2-Norm block is $$\|x\|_2 = \sqrt[2]{xx*} = \sqrt[2]{(x_I[1])^2 + (x_Q[1])^2 + \cdots + (x_I[L])^2 + (x_Q[L])^2}.$$

Counter block 54 receives the clock signal CLOCK as the input and counts from 1 to N. That is, the CTR value is an integer changing from 1 to N. In another embodiment, counter block 54 may count differently. Counter value CTR controls multiplexers 55, 56, and 57, input buffer 53, and results buffer 66.

Comparator 65 compares the computed Euclidean distance to the selected threshold value and returns a logic "1" if the Euclidean distance is below the threshold value, else, it returns a logic "0".

Result buffer 66 is an N-bit buffer to store the results of N comparisons from comparator 65. NOR (NOT OR) logic block 67 takes N stored bits in the results buffer 66 as the input, and returns zero if at least one of them is one. Else, it returns one. The output of the NOR block is considered the wakeup signal for a NFC device that includes detector 50. A logic "1" is provided for waking up the NFC device when another NFC device is detected within its RF field, and a logic "0" is provided to indicate that there is no RF device within the detectable range of it RF field and to stay in, or return to, low-power mode.

FIG. 4 illustrates a complex valued equivalent baseband RF ringing artifact signal from I and Q channels. The complex-valued equivalent baseband RF-off ringing signal from the I and Q channels may be expressed as $x[n]=x_I[n]+jx_Q[n]$, $n \in [1, L]$, where L is the length of the ringing artifact signal, and n is the sample number.

The ringing artifact signals induced in the receiver of the NFC-reader device after the RF field transmitted by the reader has been switched off, and mentioned before, may also be called RF-off ringing signals. The RF-off ringing relates to the system step-response and can hence be used to identify system characteristics representing coupled NFC/RFID devices and metallic objects.

As an example, for each channel (I or Q), the length of the ringing artifact signal capture is $N_S$ samples, each coded in $N_b$ bits. In one embodiment, $N_S=15$ samples and $N_b=10$ bits.

Figure 5:
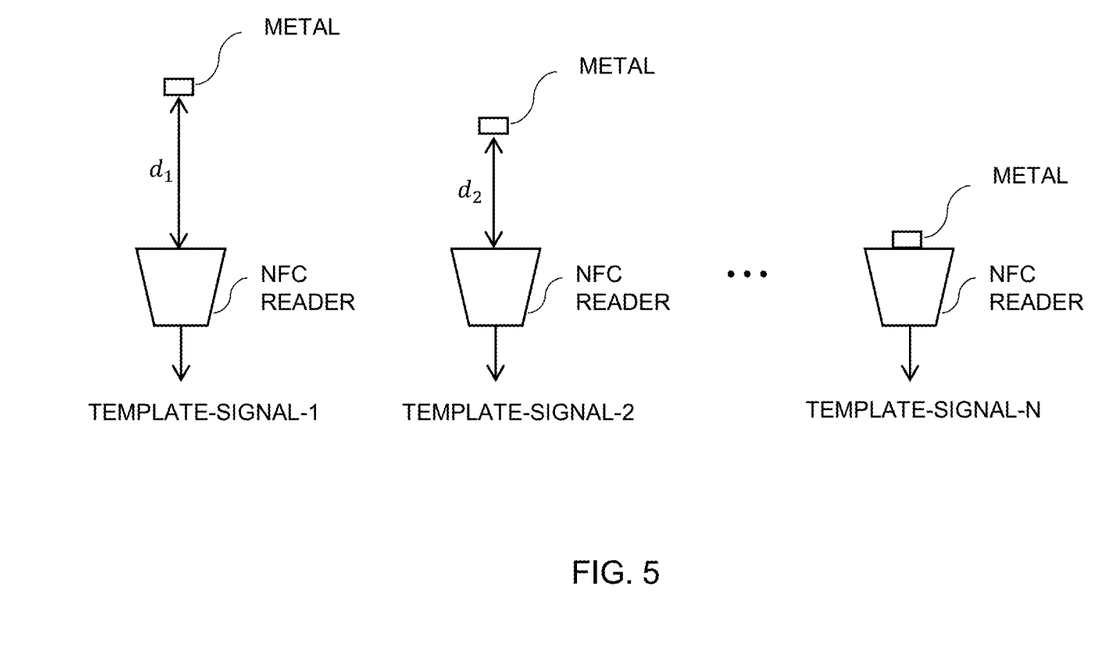
FIG. 5 illustrates a method for obtaining template signals in accordance with an embodiment.

FIG. 5 illustrates a method for obtaining template signals in accordance with an embodiment. As shown in FIG. 5, the template signals are obtained by moving a metal object toward the NFC reader and recording the ringing artifact signals at specific distances from the NFC reader. The metal object may be a solid metal object that does not include RF circuitry. In one embodiment, a number of template signals are recorded at close distances where the NFC reader device is considered loaded (e.g., 20 signals in the range 0 mm-20 mm) and one signal at a far distance ($\geq 100$ mm) where the NFC reader device is considered unloaded. The threshold values corresponding to the template signals should be tuned to guarantee zero false wakeup rate for metal objects, or objects encountered in normal day-to-day activities including metal such as keys, automobiles, appliances, etc., so that metal objects are prevented from producing false wakeups. For example, a TEMPLATE SIGNAL 1 is produced when the metal object is a $d_1$ distance away from the NFC reader, and a TEMPLATE SIGNAL 2 is produced when the metal object is a $d_2$ distance away from the NFC reader. A TEMPLATE SIGNAL N is produced with the metal object touching the NFC reader.

Figure 6:
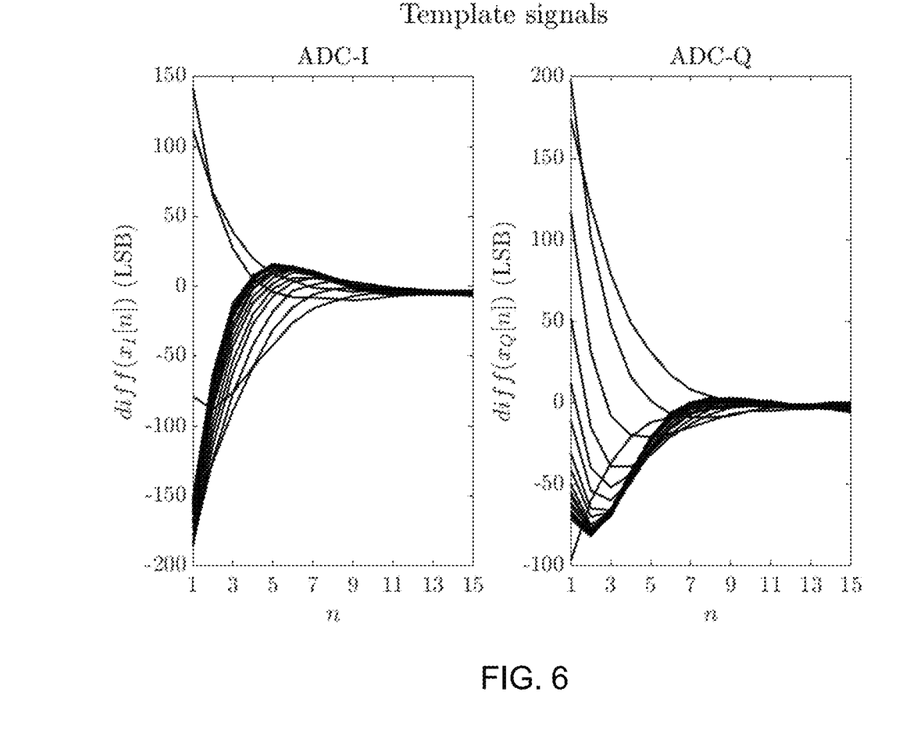
FIG. 6 illustrates a graph of template signals for I and Q channels obtained according to the method of FIG. 5.

FIG. 6 illustrates a graph of template signals for I and Q obtained according to the method of FIG. 5. FIG. 6 illustrates template signals obtained by placing the metal object at distances of 0 mm to 20 mm from the NFC reader. Other distances may be used in other embodiments. The step size was 1 millimeter (mm).

Figure 7:
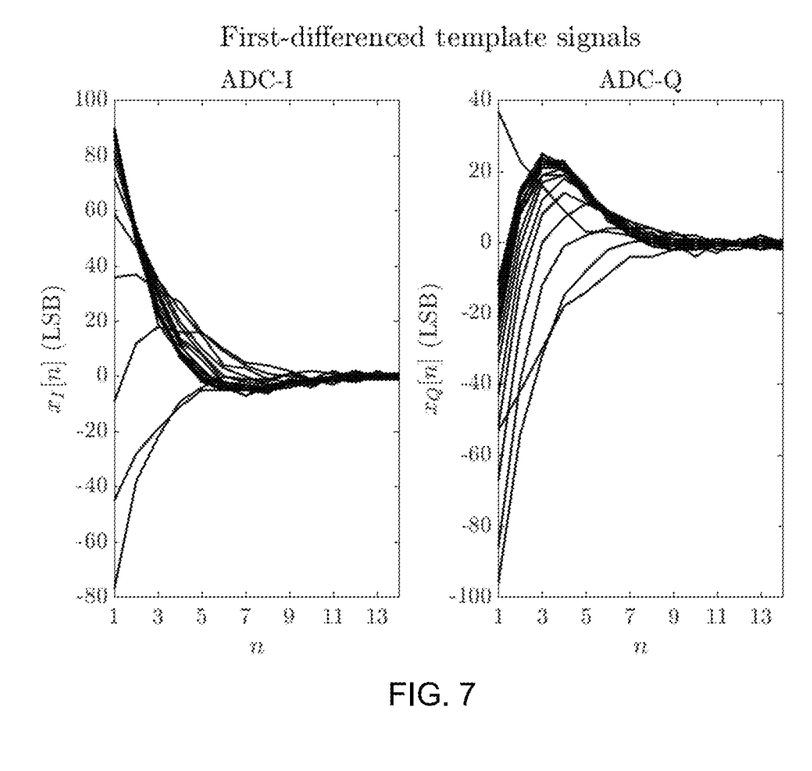
FIG. 7 illustrates a graph of a difference of the template signals for I and Q from the template signals of FIG. 6.

FIG. 7 illustrates a graph of a difference of the template signals for I and Q from the template signals of FIG. 6.

Figure 8:
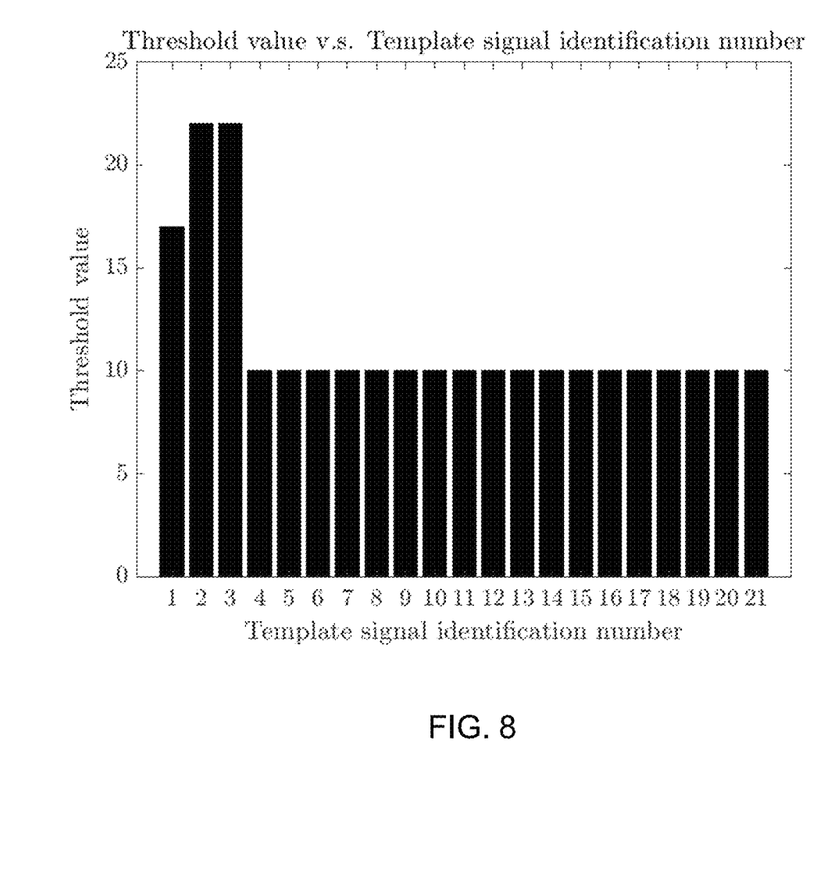
FIG. 8 illustrates a bar chart of threshold values and corresponding template signal identification numbers.

FIG. 8 illustrates a bar chart of threshold values and corresponding template signal identification numbers. For example, the threshold value for the first template signal (TEMPLATE SIGNAL-N), which corresponds to the metal object at 0 mm, is 17. The information in FIG. 8 may be recorded in a detector for an RF device as a lookup table. Ideally, minimum threshold values are chosen that lead to no wakeup from the metal object. However, in practice, even a rough selection of the threshold values, as shown in FIG. 8, leads to very reliable wakeup for NFC tags at close distances from the NFC reader. However, a cross-validation may be performed along with optimization procedures to increase the NFC counterpart's detection distance and robustness.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for detecting a presence of a second radio frequency (RF) device by a first RF device, the method comprising:

storing a plurality of templates in the first RF device;

transmitting an RF ping signal by a transmitter at an antenna of the first RF device;

receiving a ringing artifact of the RF ping signal by a receiver of the first RF device after the RF ping signal ends;

sampling the ringing artifact of the RF ping signal for a predetermined number of samples;

subtracting a first sample of the predetermined number of samples of the ringing artifact from a second sample of the predetermined number of samples of the ringing artifact to produce a ringing artifact difference;

subtracting a first template of the plurality of ringing templates from a second template in the plurality of templates to produce a template difference;

computing a distance between the ringing artifact difference and the template difference;

comparing the distance to a threshold value; and detecting a presence of the second RF device to the first RF device if the distance compares favorably to the threshold value.

2. The method of claim 1, wherein determining the distance between the ringing artifact difference and the template difference further comprises computing a Euclidean norm of the RF ringing artifact.

3. The method of claim 1, wherein the threshold value is one of a plurality of threshold values, the method further comprising:
performing the method for all of the predetermined number of samples and the plurality of ringing templates; and
comparing a distance for each of the samples to a corresponding threshold value of the plurality of threshold values to determine a plurality of comparison results; and
a logic gate having inputs for receiving the plurality of comparison results and an output for providing a wakeup signal to the first RF device in response to detecting the presence of the second RF device.

4. The method of claim 3, further comprising using a counter to select each of the samples and corresponding ringing templates.

5. The method of claim 1, wherein computing the distance further comprises computing the distance using one of either Euclidean distance, Manhattan distance, Minkowski distance, Levenshtein distance, dynamic time warping, or Kullback-Leibler divergence.

6. The method of claim 1, wherein the stored ringing templates are ordered according to a distance from the RF device.

7. The method of claim 1, further comprising determining the plurality of threshold values by moving a metal object toward the first RF device while recording resulting RF ringing artifacts at specific distances from the first RF device.

8. The method of claim 1, wherein the first RF device and the second RF device communicate using a near field communication (NFC) protocol.

9. The method of claim 1, wherein the first RF device is a smartphone.

10. A method for detecting a presence of a second radio frequency (RF) device by a first RF device, the method comprising:
storing a plurality of template signals in the first RF device;
storing a plurality of corresponding threshold values;
sampling, by a logic circuit of the first RF device, a ringing artifact of a RF ping signal for a predetermined number of samples, wherein the ringing artifact is generated at an end of the RF ping signal transmitted by the first RF device;
subtracting a first sample of the predetermined number of samples of the ringing artifact from a second sample of the predetermined number of samples of the ringing artifact to produce a ringing artifact difference;
subtracting a first sample of a predetermined number of samples of a template signal of the plurality of template signals from a second sample of the predetermined number of samples of the plurality of templates signals to produce a template difference;
computing a distance between the ringing artifact difference and the template difference;
comparing the distance to a threshold value to produce a comparison result;
performing the steps of subtracting, computing, and comparing for each sample of the plurality of samples to produce a plurality of comparison results;
providing the plurality of comparison results to a results buffer; and
detecting, using a logic gate coupled to the results buffer, a presence of the second RF device by the first RF device in response to at least one of the plurality of comparison results comparing favorably to a corresponding threshold value of the plurality of corresponding threshold values.

11. The method of claim 10, wherein computing the distance further comprises computing the distance using one of either Euclidean distance, Manhattan distance, Minkowski distance, Levenshtein distance, dynamic time warping, or Kullback-Leibler divergence.

12. The method of claim 10, wherein the RF device communicates with the counterpart device using a near field communication (NFC) protocol.

13. The method of claim 10, wherein the plurality of template signals are recorded by moving a metal object toward the first RF device while recording resulting RF ringing artifacts at specific distances from the first RF device.

14. The method of claim 10, wherein the logic gate is NOR logic gate.

15. A radio frequency (RF) device comprising:
a memory configured to store a plurality of template signals;
a transmitter configured to transmit an RF ping signal at an antenna of the RF device;
a receiver configured to receive a ringing artifact of the RF ping signal after the RF ping signal ends; and
a logic circuit configured to sample the ringing artifact of the RF ping signal for a predetermined number of samples, and for each sample:
subtract a first sample of the predetermined number of samples of the ringing artifact from a second sample of the predetermined number of samples of the ringing artifact to produce a ringing artifact difference;
subtract a first sample of a predetermined number of samples of a template signal of the plurality of template signals from a second sample of the predetermined number of samples of the plurality of templates signals to produce a template difference;
compute a distance between the ringing artifact difference and the template difference;
compare the distance to a threshold value; and
detect a presence of another RF device if the distance is greater than the threshold value.

16. The RF device of claim 15, wherein the logic circuit further comprises a logic gate to detect the presence of the another RF device if the distance is greater than the threshold value.

17. The RF device of claim 16, wherein the logic gate provides a wakeup signal to the RF device in response to detecting the presence of the another RF device.

18. The RF device of claim 15, further comprising using a counter to select each of the samples and corresponding ringing templates.

19. The RF device of claim 15, wherein the distance is computed using one of either Euclidean distance, Manhattan distance, Minkowski distance, Levenshtein distance, dynamic time warping, or Kullback-Leibler divergence.

20. The RF device of claim 15, wherein the RF device and the another RF device communicate via a near field communication (NFC) protocol.

\* \* \* \* \*